Patented Nov. 12, 1946

2,411,136

UNITED STATES PATENT OFFICE 2,411,136

ESTERIFICATION REACTIONS

Stewart B. Luce, Springfield, Mass., assignor to Monsanto Chemical Company, St. Louis, Mo., a corporation of Delaware No Drawing. Application March 21, 1942, Serial No. 435,637

9 Claims. (Cl. 260—485)

This invention relates to a novel method of producing esters and to novel compounds resulting therefrom.

The reaction of such an unsaturated alcohol as methallyl alcohol with such an unsaturated organic acid as maleic acid with the production of a desirable yield of esters has long been a problem, chiefly because the usual esterification catalysts, such as sulfuric acid, alkali metal acid sulfate and zinc chloride, are too violent in their action and produce undesirable reactions at a violent rate instead of the desired esterification. Other methods of forming the methallyl maleate ester have been considered, but these relate to indirect methods which are far from satisfactory.

It has now been discovered that such an unsaturated alcohol as methallyl alcohol can be reacted directly with such an unsaturated organic acid as maleic acid, especially by means of dry intumesced alkali metal silicate as a catalyst. This catalyst may preferably be prepared, for example, by evaporating off the water from a sodium silicate solution, such as the ordinary commercial sodium silicate solution known as water glass, and, when most of the water has been removed, heating to a relatively high temperature (red heat) to form a voluminous porous intumesced substantially anhydrous sodium silicate. This material is then cooled and is, preferably, pulverized to obtain the preferred form of the catalyst. When thoroughly pulverized, the material may show little, if any, porous structure. The silicate material obtained as described above whether pulverized or not is conveniently referred to as intumesced, it being understood that the material is porous without, or before, being pulverized.

It is preferred that the pulverulent intumesced silicate be maintained in dry condition for use as a catalyst in accordance with this invention. Other alkali metal silicates may be used, for example, potassium, lithium, cesium and rubidium silicates. The temperature to which the silicate is heated may range from about 200° to around 1100° C., preferably from about 400° to 600° C., but it is preferred not to heat above the fusing point of the silicate, which is around 1100° C. Temperatures less than 200° C. may be used, especially if a vacuum is used, but such low temperatures will usually be found to produce a product not as satisfactory as that obtained at higher temperatures.

The following examples of the invention are given primarily for the purpose of illustrating and exemplifying the invention and not by way of limitation.

EXAMPLES

Preparation of catalyst. A catalyst was prepared by evaporating off the water from a sodium silicate solution, known as water glass, continuing the heating to a red heat to produce a voluminous porous puffed intumescent material, which was cooled and then pulverized. This dry pulverized material was used as a catalyst in the following examples.

*Example 1*

The preparation of dimethallyl maleate, 432 grams (6 mols) of methallyl alcohol (B. P. 37–38° C. at 20–25 mm.) and 294 grams (3 mols) maleic anhydride were mixed with 8.64 grams of the intumesced sodium silicate prepared as described above (2% based on the alcohol). The mixture was heated in a flask placed in an oil bath, using an air condenser above the flask to effect refluxing, for 2½ hours at a bath temperature of 140–160° C. and for 2½ hours at a bath temperature of 160–180° C. Then 432 grams more of the methallyl alcohol were added, by dropping it slowly into the mixture over a period of eight hours while maintaining the bath at 180–200° C. Heating at 180–200° C. was continued for 11 hours more while the unreacted alcohol and the water formed during the reaction were distilled off. The mixture was then cooled, the catalyst filtered off and the clear liquid vacuum distilled. The fraction boiling at 140–210° C. at 20–25 mm. was collected, and the yield of this fraction was 79.3% of the theoretically possible yield of dimethallyl maleate based on maleic anhydride charged. Substantially all of this fraction, over 99 per cent thereof, boiled in the range of 180–200° C. at 20–25 mm. The physical constants of this fraction were found to be as follows:

Color—very pale yellow, almost colorless
Boiling point (by capillary tube) 255–260° C.
Density at 20° C. 1.057 grams/cubic centimeter
Refractive index $n_D$ 20° C.=1.4702

The saponification equivalent of this fraction was found to be 106.4. The calculated value of dimethallyl maleate is 112.

This fraction of dimethallyl maleate polymerized readily upon heating (at about 115° C.) with 1% benzoyl peroxide to form a clear, hard, pale yellow and almost colorless resin. The density of this polymer was found to be 1.230 grams/cc. and its hardness was found to be 20 by the Rockwell hardness tester.

Example 2

The preparation of methallyl butyl maleate. 72 grams of methallyl alcohol (1 mol), 74 grams of butanol (1 mol) and 98 grams of maleic anhydride (1 mol) were mixed with 2.8 grams of dry sodium silicate prepared as described above. The mixture was heated for 3 hours at 140–160° C. using an air condenser, for 2½ hours at 160–180° C., and then a mixture of 72 grams of methallyl alcohol and 74 grams of butanol was added over a period of 1½ hours, while reducing the temperature to 140–160° C. Excess alcohols and water formed in the reaction were distilled off. Total time of heating 19 hours. The catalyst was filtered off and the remaining liquid vacuum distilled. A 192 gram fraction boiling between 140–190° C. (mostly 170–180° C.) at 25–30 mm. was obtained. The fraction boiling between 140–190° C. at 25–30 mm. was collected, and the yield of this fraction was 84.2% of the theoretically possible yield of methallyl butyl maleate based on the maleic anhydride charged. Substantially all of this fraction, over 99% thereof, boiled in the range of 170–180° C., at 25–30 mm. The physical constants of this fraction were found to be:

Color—very slight, pale yellow, substantially colorless
Refractive index $n_D^{20°} C. = 1.4555$ This material polymerized readily on heating (at 100–105° C. for about 10 minutes) with about 1% benzoyl peroxide to form a clear, hard, pale yellow and almost colorless resin. Its density was found to be 1.211 grams/cc. and hardness 27 (Rockwell).

Example 3

The preparation of methallyl octyl maleate. 72 grams of methallyl alcohol (1 mol), 130 octyl alcohol (1 mol), and 98 grams maleic anhydride (1 mol) were mixed with 4 grams dry sodium silicate prepared as described above. The mixture was heated for 2 hours at 140–160° C. using an air condenser, for 3½ hours at 160–180° C. and then a mixture of 72 grams methallyl alcohol and 130 grams octyl alcohol was added over a period of 4 hours heating at 160–180° C. Heating was continued at 180–200° C. for 9 hours more during which time the excess alcohols and the water formed in the reaction were distilled off. The catalyst was filtered off and the remaining liquid vacuum distilled, and a 171 gram fraction boiling at 165–225° C. at 35 mm. was obtained. The yield was 58.2% of the theoretically possible yield based on the maleic anhydride used. The physical constants of this fraction were found to be:

Color—pale amber
Refractive index $n_D^{20} = 1.4561$

The product polymerized with about 2% benzoyl peroxide to give a jelly-like mass.

Example 4

The preparation of methallyl hydroxy-ethyl maleate. 72 grams methallyl alcohol (1 mol), 62 grams ethylene glycol (1 mol) and 98 grams maleic anhydride were mixed with 2.6 grams dry sodium silicate prepared as described above. The mixture was heated 2 hours at 140–160° C. using an air condenser, for three hours at 160–180° C. and then for 2 more hours at 160–180° C. while dropping in slowly 72 grams methallyl alcohol. Heating was continued at 180–200° C. for 12 hours. Excess alcohol and water formed were distilled off. A bright yellow syrupy liquid was obtained.

This bright yellow syrupy liquid product gradually increased in viscosity until it became a solid mass after 3 months at room temperature.

Example 5

The preparation of methallyl glyceryl maleate. 72 grams (1 mol) methallyl alcohol, 92 grams (1 mol) glycerine and 98 grams (1 mol) maleic anhydride were mixed with 3.2 grams dry sodium silicate prepared as described above. The mixture was heated 2 hours at 140–160° C. using an air condenser for 3 hours at 160–180° C. and then for 1½ hours at 160–180° C. during which time 72 grams additional methallyl alcohol was allowed to drop in. The mixture was heated 12½ hours longer at 180–200° C. Excess alcohol and water formed were distilled off. An amber colored viscous liquid product was obtained.

This amber colored viscous liquid product polymerized slowly over a 3 months period to give a solid mass.

Example 6

The preparation of methallyl phenyl maleate. 72 grams (1 mol) methallyl alcohol, 94 grams (1 mol) phenol and 98 grams maleic anhydride (1 mol), were mixed with 3.3 grams of dry sodium silicate prepared as described above. The mixture was heated 4 hours 160–180° C. using an air condenser, and for 1¼ hours at 160–180° C. during which time 72 grams additional methallyl alcohol was added. Further heating for 14 hours at 180–200° C. was carried out. The viscous mass obtained solidified during 3 months at room temperature.

As indicated by the foregoing examples where the organic acid is an unsaturated dicarboxylic acid, such as maleic acid, the mixed ester may be produced in accordance with this invention. Instead of butanol and octyl alcohol, as in Examples 2 and 3 above, other alkyl, aryl, aralkyl alcohols may be used, including phenolic compounds. Moreover, these alcohols may be monohydric or polyhydric.

The foregoing examples illustrate certain specific chemical reactions and products that are included within this invention. In a broader sense, however, this invention embraces the esterification of reactants, such as an alcohol and an organic acid, which, when no catalyst is used or when the usual esterification catalysts are used, undergo an undesired reaction as the dominant reaction, and esterification, even when it does take place at all, does so at such a relatively slow rate that it is not observable. For example, if the mixture in Example 1 be heated without a catalyst or with sulfuric acid as the catalyst, an undesired reaction proceeds to the exclusion of any observable esterification. It is a significant feature of this invention that esterification can be obtained in accordance with this invention even under those conditions which would, without the use of the catalyst of this invention, cause an undesired reaction substantially to the exclusion of esterification.

The unsaturated organic compounds, particularly the alcohols, which may be esterified in accordance with the invention are characterized by having a hydroxyl group and an aliphatic unsaturated carbon atom, regardless of the character of the organic compound in which said hydroxyl group and unsaturated aliphatic carbon atom may be contained. These organic compounds may contain aliphatic, aromatic, alicyclic, heterocyclic, and cycloaliphatic groups, and particularly the hydrocarbon groups; namely, alkyl, aryl, aralkyl, and cyclic non-benzenoid hydrocarbon groups and may be alcohols, including both alkyl and aromatic alcohols, and phenols, or derivatives thereof.

Examples of these compounds are allyl alcohol, methallyl alcohol, crotonyl alcohol, tiglyl alcohol, gamma-gamma-dimethallyl alcohol, propargyl alcohol, propargyl carbinol, pentine (1) ol (3), vinyl phenol allyl phenol (chavicol), methyl allyl phenol (4 methyl 2 propenyl phenol), allyl naphthol, methyl allyl p-tolyl carbinol, allyl salicylic acid, allyl borneol, methyl allyl cyclohexanol, vinyl cyclohexanol, allyl cyclohexanol, allyl α-furyl carbinol, isobutylene p-phenol.

This invention particularly comprehends esterification of an alcohol of the "allyl type," such as referred to in U. S. Patent 2,164,188, at p. 1, column 1, line 35 to page 2, column 1, line 7, with a carboxylic acid and especially an unsaturated carboxylic acid. These unsaturated alcohols are characterized by having a carbinol group bonded to an unsaturated aliphatic carbon atom. These alcohols may be referred to as "allyl type alcohols" since they comprise the group represented by the formula

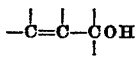

which is, of course, characteristic of allyl alcohol, its homologues, analogues and substitution products. The allyl alcohols with which this invention is particularly concerned have at least one

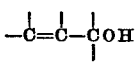

group regardless of the character of the rest of the organic compound. The alcohol may comprise a branched or straight alkyl chain, which may or may not be attached to a cyclic radical as one from the aromatic, alicyclic and heterocyclic series, or may comprise in part an alicyclic structure. A preferred group of allyl type alcohols to be esterified in accordance with this invention includes those containing an unsaturated tertiary carbon atom. Methallyl alcohol and gamma-gamma-dimethyl allyl alcohol are examples of this group.

This tertiary carbon atom may be at least one of the two carbon atoms linked by the unsaturated bond referred to by reference above to the "unsaturated aliphatic carbon atom" bonded to the carbinol group. The carbon atom of the carbinol group may be primary, secondary, or tertiary. The alcohols of the allyl type containing the group represented by the formula given above may have attached to that group a hydrogen, halogen, hydroxy, alkyl, alkoxy, carboxylic, heterocyclic, aralkyl, aralkoxy, aryloxy, and/or other suitable organic radicals which may or may not be further substituted, or they may be taken up by suitable monovalent substituents, but neither a halogen nor another hydroxyl group is linked to the carbinol carbon atom.

Allyl type alcohols include, among others, compounds such as

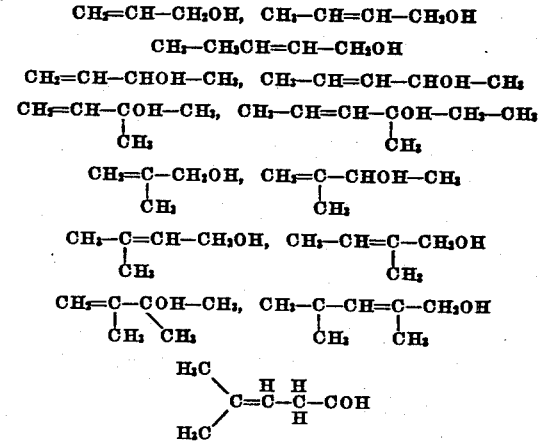

and the like and their homologues, analogues and suitable substitution products.

The unsaturated organic acids contemplated by this invention may be mono- or dicarboxylic and include such acids as maleic, methyl maleic, fumaric, methyl-fumaric, acrylic, methyl acrylic, crotonic, isocrotonic, itaconic, vinyl acetic, and is particularly concerned with the unsaturated organic acids having less than about eight carbon atoms. Although the invention especially relates to the aliphatic acids and particularly the fatty acids, the acids may have an aromatic heterocyclic or alicyclic group, and including, for example, phenyl-maleic, benzyl maleic, dibenzyl-maleic and cinnamic acids. Moreover, the acid may include an acetylenic linkage either in place of or in addition to the unsaturated ethylenic linkage. It is preferred to have the organic acid in the anhydride form. Although this invention embraces the acids as pointed out above, it is more particularly concerned with dicarboxylic acids, and especially the group consisting of maleic, citraconic (methyl maleic), fumaric and mesaconic (methyl fumaric) acids, preferably in the anhydride form.

This invention may be carried out in a number of different ways which will be apparent to those skilled in the art. In a preferred method of operation, however, the esterification is effected by heating the acid with an excess of the alcohol in contact with the catalyst. The reactants and catalyst may be introduced into a suitable reaction vessel preferably equipped with a means for heating. The reactants and catalyst may be introduced into the vessel, either one at a time or may be mixed before introduction therein. It is preferred to add excess alcohol slowly to a mixture of catalyst, alcohol, and acid, especially when the acid is an unsaturated dicarboxylic acid like maleic acid which, as pointed out above, is preferably in the anhydride form. Unsually the reaction is effected by heating the reactants in contact with the catalyst under refluxing conditions while distilling off any water. It is desirable that water be distilled off from the reaction chamber, since reducing the concentration of water in the reaction mixture increases the rate of esterification.

Although, as pointed out above, this invention is particularly concerned with the production of an ester from reactants at least one of which is unsaturated as pointed out above, the invention also comprehends the use of the substantially anhydrous intumesced alkali silicate as described above as a catalyst for the esterification of a saturated alcohol with a saturated organic acid. Examples include the esterification of such alcohols as methyl, ethyl, propyl, etc. alcohols, benzyl alcohol, and phenols with saturated mono- or dicarboxylic acids such as for example, acetic acid, propionic, butyric, etc. acids, succinate acid, phthalic acid, etc.

Modifications may be made in the above disclosure without departing from the spirit and scope of the invention as defined in the appended claims.

I claim:

1. In a method of producing an ester by the esterification of an organic acid with an alcohol, one of which is unsaturated, the improvement which comprises effecting the esterification by means of a catalyst comprising an intumesced alkali metal silicate.

2. In a method of esterifying an allyl type alcohol with a carboxylic acid, the improvement which comprises effecting the esterification by means of a catalyst comprising an intumesced alkali metal silicate.

3. The method as defined in claim 2 in which the carboxylic acid is an unsaturated dicarboxylic acid.

4. The method as defined in claim 2 in which the allyl type alcohol contains an unsaturated tertiary carbon atom.

5. The method as defined in claim 2 in which the carboxylic acid is in the anhydride form.

6. In a method of esterifying an allyl type alcohol with an unsaturated dicarboxylic acid, the improvement which comprises effecting esterification with the acid in the anhydride form and by means of a catalyst comprising a dry intumesced alkali metal silicate.

7. In a method of producing dimethallyl maleate by esterifying maleic acid with methallyl alcohol, the improvement which comprises esterifying the maleic acid in the anhydride form with the methallyl alcohol by means of a catalyst comprising an intumesced sodium silicate.

8. In a method of producing a methallyl alkyl maleate by esterifying maleic acid with an alkyl alcohol and methallyl alcohol, the improvement which comprises effecting the esterification by means of a catalyst comprising an intumesced alkali metal silicate.

9. In a method of producing a mixed ester by esterifying an unsaturated dicarboxylic acid with at least two different alcohols, the improvement which comprises effecting the esterification by means of a catalyst comprising an intumesced alkali metal silicate.

STEWART B. LUCE.